United States Patent [19]

St. Leger Searle

[11] 4,309,070
[45] Jan. 5, 1982

[54] DISPLAY APPARATUS

[75] Inventor: Simon M. St. Leger Searle, Cranham, England

[73] Assignee: Smiths Industries Limited, London, England

[21] Appl. No.: 113,163

[22] Filed: Jan. 18, 1980

[30] Foreign Application Priority Data

Jan. 19, 1979 [GB] United Kingdom ............... 01979/79

[51] Int. Cl.$^3$ ........................ G02B 5/32; G02B 27/14
[52] U.S. Cl. ...................................... 350/3.7; 350/174
[58] Field of Search ..................... 350/3.6, 3.65, 3.7, 350/96.1, 3.72, 3.73, 174

[56] References Cited

U.S. PATENT DOCUMENTS 3,737,212 6/1973 Antonson et al. ................. 350/3.65
3,940,204 2/1976 Withrington ........................ 350/3.65

*Primary Examiner*—John K. Corbin
*Assistant Examiner*—Bruce Y. Arnold
*Attorney, Agent, or Firm*—Pollock, Vande Sande & Priddy

[57] ABSTRACT

An aircraft head-up display system has a combiner comprising a block of transparent glass and a plate of transparent glass cemented to the rear of the block. The plate carries a reflection holographic element on its front surface abutting the block. Light from a display on the screen of a cathode-ray tube is projected into the combiner through one edge, at an acute angle onto its front face. The light is then reflected rearwardly through the holographic element to the rear face of the plate where it is reflected forwardly again. The holographic element is arranged such that some of the light incident on it from the successive reflections within the combiner is reflected at right angles to the surface of the plate, forwardly through the front face of the combiner and into the line-of-sight of the observer. Successive reflections cause light to emerge at several locations along the length of the combiner so as thereby to increase the field of view of the system. Alternatively, the plate carries a transmission holographic element and is cemented to the front face of the glass block. The holographic element may be arranged to pass externally of the combiner only light of the same wavelength as that produced by the screen of the cathode-ray tube.

11 Claims, 4 Drawing Figures

DISPLAY APPARATUS

BACKGROUND OF THE INVENTION

The invention is particularly concerned with display apparatus for use in head-up display systems, that is to say, systems of the kind in which a display is generated for projection onto a partially-transparent optical element located in a line-of-sight from an observer such as to provide an image of the display against the background of the external scene through the element. Such systems are used in, for example, aircraft, the display being provided by a cathode-ray tube and involving symbols that in the image seen in the partially-transparent element, are positioned against the background of the external scene through the aircraft windscreen to give indication of such factors as aircraft attitude and flight-path. The optical element used in such systems is generally in the form of a reflector provided by a transparent glass plate coated with a semi-transparent metallic layer.

Because of the limited space available within an aircraft cockpit, and hence the restrictions imposed on the size of apparatus used in the cockpit, it has been difficult in the past to provide head-up display systems with large exit pupils and large fields-of-view. The exit pupil and field-of-view of such systems are generally dictated by the size of the display screen and the optical system used to project the image of the screen into the observer's line-of-sight. A large exit pupil is desirable since it enables the observer to see the display over a greater range of head positions and hence gives him greater freedom of movement.

BRIEF SUMMARY OF THE INVENTION

It is an object of the present invention to provide display apparatus that may be used to alleviate the above difficulty.

According to one aspect of the present invention there is provided display apparatus including an optical element substantially of optically-transparent material having a pair of opposite faces, the optical element being arranged to receive light from a display and to direct the light through at least one of the faces so as to provide an image of the display, wherein one face is arranged to receive light from said display and to reflect a part at least of said light internally of the optical element to the other face, the other face being arranged to reflect a part at least of said light back to said one face such as thereby to produce successive internal reflections of the light within the optical element along it, and wherein the apparatus includes a holographic element arranged to pass externally of said optical element a part of the light directed to the one or other face from successive internal reflections such that light from said display thereby emerges from the one or other face of the optical element via said holographic element at locations spaced along the optical element.

The holographic element may be a reflection holographic element that is located adjacent a face of the optical element and that is arranged to reflect light incident on the holographic element through the opposite face of the optical element. Alternatively, the holographic element may be a transmission holographic element that is located adjacent a face of the optical element and that is arranged to transmit light incident on the holographic element through the same face of the optical element. The display may be provided by the screen of a cathode-ray tube. The opposite faces of the optical element may be substantially optically-transparent so that light external of the optical element can be transmitted through the optical element via the opposite faces. The holographic element may be arranged to pass externally of the optical element selectively substantially only that light having predetermined wavelength characteristics or that light incident on the holographic element at predetermined angles.

A head-up display system for an aircraft including display apparatus in accordance with the present invention, will now be described, by way of example, with reference to the accompanying drawings.

DETAILED DESCRIPTION

Figure 1:
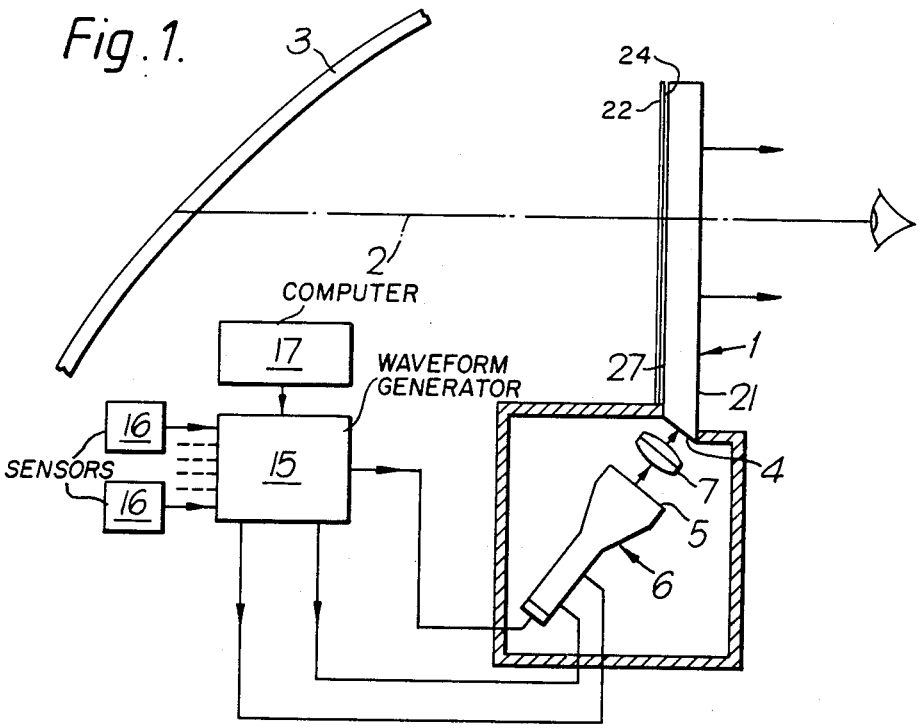
FIG. 1 is a schematic representation of a head-up display system.

Referring to FIG. 1, a combiner 1 is mounted in front of the pilot within the cockpit of an aircraft and in his line-of-sight 2 through the aircraft-windscreen 3. A display of flight and weapon-aiming information is projected on one edge 4 of the combiner 1, the combiner directing an image of the display to the pilot (in a manner described below) so that he sees the display image in the combiner against the background of the external scene through the windscreen 3. The display is projected from the display area or screen 5 of a cathode-ray tube 6 by an optical system 7 that serves to focus the image seen by the pilot substantially at infinity.

Figure 2:
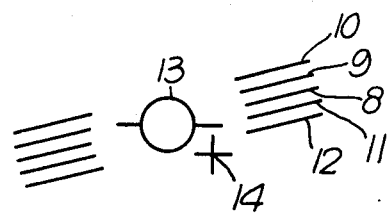
FIG. 2 is illustrative of symbology involved in the display provided by the system of FIG. 1.

The information displayed includes, as illustrated in FIG. 2, analogue presentation of aircraft attitude involving five pitch-bars 8 to 12 (each in the form of two spaced and aligned lines) and a flight-vector symbol 13 (in the form of a circle with short laterally-extending arms). The flight-vector symbol 13 remains stationary in the centre of the screen 5 of the cathode-ray tube 6 and its image therefore remains stationary in the pilot's field of view through the combiner 1. The five pitch-bars 8 to 12, however, move so as to be seen by the pilot to be displaced angularly, and also up and down, relative to the symbol 13, in accordance with bank and pitching movements respectively of the aircraft. The bars 8 to 12 remain parallel to one another and their movements on the screen 5 are regulated by reference to the vertical (established, for example, by a gyroscope or other attitude sensor in the aircraft) in such a way as to maintain them with the middle line 8 indicative of the horizontal (zero pitch-angle) and the other four lines 9 to 12 above and below it at pitch-angle intervals of thirty degrees. The weapon-aiming information on the other hand, and as illustrated in FIG. 2, involves a cross symbol 14 that is moved in the display on the screen 5 so as to be seen by the pilot in image against the external scene through the windscreen 3, and to denote a desired line of aim of the aircraft weapon-system (or a selected part of it). The pilot's task is to manoeuvre the aircraft to bring the symbol 14 within the flight-vector symbol 13 and accordingly align the aircraft appropriately for firing of the weapon system.

The electric time-base and video signals required to produce the display of flight and weapon-aiming information on the screen 5, are supplied to the cathode-ray tube 6 by a waveform generator 15 (FIG. 1). The waveform generator 15 provides a raster time-base and generates the relevant video signals in accordance with signals it receives from appropriate attitude, and other, sensors 16, and a weapon-aiming, or other, computer 17. In this respect it is to be understood that the display generated, and as embodied in the video signals supplied to the cathode-ray tube 6, may embrace a wider variety of information than that involved in the simplified form illustrated in FIG. 2. Any of the information may be presented in digital or analogue form, or both. However, in each case the information is displayed by brightness modulation of the cathode-ray tube 6 display-raster produced by the line and frame time-base signals that are applied to the deflection system of the tube by the waveform generator 15. The video signals required for different parts of the symbology (8 to 14) are derived separately in the waveform generator 15 and are then mixed together for application to the grid electrode of the cathode-ray tube 6. Each such signal is derived in accordance with the successive instants in the time-base raster at which bright-up is to occur to achieve a 'paint' of the relevant symbol, or symbol group, in the appropriate position on the screen 5. Further details of arrangements by which symbology can be presented are given in U.K. patent specification No. 1526396 and U.S. Pat. No. 4,127,850.

The manner in which the optical element or combiner 1 produces an image of the display screen 5 in the line-of-sight 2 of the pilot, will now be described in greater detail with reference to FIG. 3. The combiner 1 includes a thick elongate glass block 20 that extends vertically upwards in a plane at right angles to the line of sight 2 of the pilot. The thickness of the block 20 is of generally rectangular cross-section but with its lower edge face 4 inclined at an angle $\theta$ of about 60 degrees to its front face 21, that is, the face of the combiner 1 closest the pilot. The combiner 1 also includes a glass plate 22 cemented to the rear face 23 of the block 20. The plate 22 has a holographic element 24 on its front surface which is in abuttment with the rear face 23 of the block 20.

The cathode-ray tube 6 is located below the combiner 1 and is arranged such that its screen 5 is parallel to the edge face 4 of the combiner. The optical system 7, which consists of a converging lens, or converging lens system, is positioned with its focal plane coincident with the screen 5 so that an image of the display on the screen is focussed at infinity in the form of a parallel beam of light 25 directed at right-angles to the lower face 4 of the combiner 1. This beam of light 25 passes through the lower edge face 4 into the block 20 and towards the front face 21 where is undergoes total internal reflection. A beam of light 26 is reflected from the front face 21 rearwardly through the rear face 23 of the glass block 20 to the rear face 27 of the plate 22 where it also undergoes total internal reflection. FIG. 3 shows the beam of light from the display being reflected three times from the front face 21 of the combiner and three times from the rear face 27. It will be appreciated that, by selecting the angle at which the beam 25 is directed at the combiner 1 (whilst ensuring that the angle $\theta$ is greater than the critical angle for total internal reflection) and the dimensions of the combiner, the number of reflections can be increased or reduced.

The holographic element 24 on the front of the glass plate 22 acts to reflect some of the light incident on it forwardly at right angles through the rear face 23 of the block 20 and through its front face 21 towards the pilot. More particularly, the holographic element 24 is selective of light at the particular wavelength emitted by the phosphors of the cathode-ray-tube screen 5 and is selective of light incident on the element at the angle $\theta$ to the normal. Thus, the beam of light reflected by the front face 21 of the glass block and incident on its rear face 23 are, in part, reflected forwardly by the element 24 along the normal to the rear face. The amount of light reflected by the rear face 27 of the plate 22 ( as distinct from the light reflected by the holographic element 24) at the angle $\theta$ to the normal will of course be reduced in intensity because of the loss of light by reflection from the holographic element 24. The holographic element 24 is preferably arranged such that it reflects a greater proportion of light for those beams which have undergone the greatest number of reflections so that the light emergent from the combiner 1 is of substantially the same intensity along its length.

Figure 3:
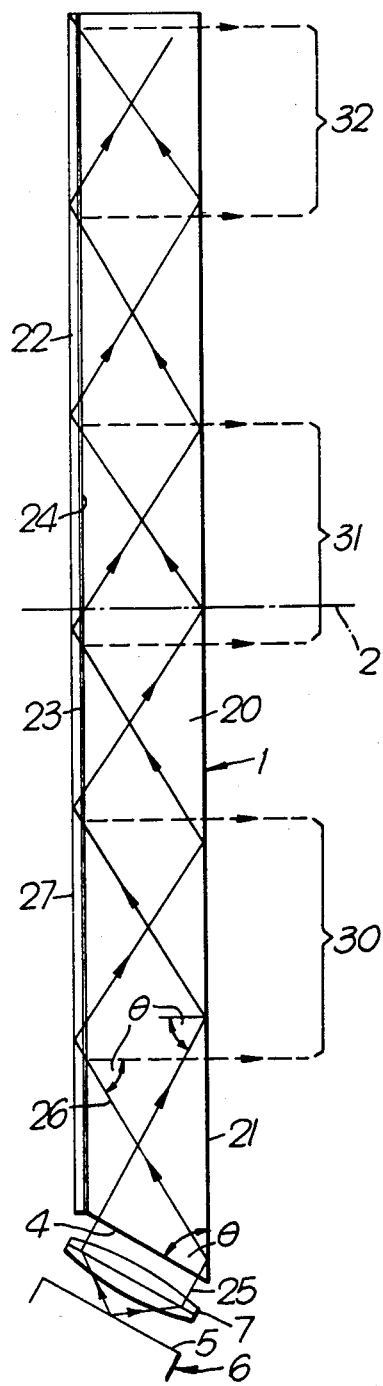
FIG. 3 shows in more detail a part of the display system.

FIG. 3 shows three emergent beams 30, 31 and 32 reflected by the holographic element 24 towards the pilot. These beams 30 to 32 are separated from one another along the length of the combiner 1. The pilot will therefore see an image of the display screen 5, focussed at infinity by looking along any one of these beams 30 to 32 and the field-of-view of the apparatus along a vertical axis will therefore be determined by the height of the combiner 1 and not solely by the size of the cathode-ray-tube screen 5. For clarity, the emergent beams 30 to 32 are shown separated from one another but, in general, the beams will be arranged to abut or overlap one another so as to produce a continuous field-of-view over the length of the combiner 1.

Construction of reflection holographic elements of the type referred to above, that is, where the angles of the incident and reflected beams to the normal are not equal, is well-known, similar holographic elements being described in, for example, U.K. patent specifications Nos. 1 387 717 and 1 423 947, and in U.S. patent specifications Nos. 3,575,485, 3,586,412 and 3,807,829. Holograms and holographic elements in general are formed by exposing a holographic, or photosensitive, medium to two beams of coherent radiation, such as, laser beams. An interference pattern is set up which is dependent on the differences in phase between the two beams across the surface of the holographic medium. The pattern is recorded by developing the medium, which may be in the form of an emulsion on a plate, and, when the developed pattern is illuminated by suitable radiation, the original illuminating condition can be reconstructed. Thus, for example, if a holographic element is made by recording the interference pattern between an object beam incident at right angles to the element and a reference beam incident at an angle $\theta$ to the element then, if the element, after developing, is illuminated with a beam incident at an angle $\theta$ it will produce a beam at right angles to the element. The element thereby functions in an analagous manner to that of a reflector. In a similar way it is possible to produce a holographic element which acts to transmit a beam of light. In this way, when illuminated by a beam of light incident at a particular angle on one face of the element, a beam will be produced from the opposite face at any selected angle.

Figure 4:
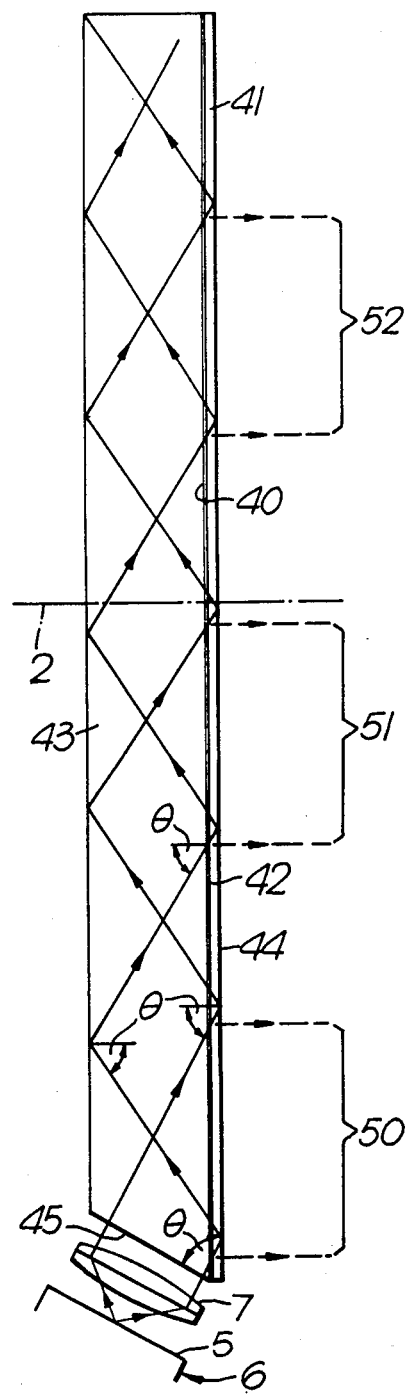
FIG. 4 shows an alternative arrangement of a part of the display system.

FIG. 4 shows an alternative embodiment which is similar to that of FIG. 3 but uses instead a transmission holographic element 40. The transmission holographic element 40 is formed on the rear surface of the glass plate 41 which is cemented on the front surface 42 of a glass block 43. A light beam from the display screen 5 is incident on the front face 44 of the plate 41, via an inclined lower edge face 45, at an angle $\theta$ to the normal. A part of the light undergoes total internal reflection from the front face 44 and a part of the light is transmitted by the action of the transmission holographic element 40 to emerge at right angles to the front face as three parallel beams 50 to 52. It would also be possible to provide a combiner having a glass block with a transmission holographic element on its front face and a reflection holographic element on its rear face. Such a combiner could be arranged such that light reflected by the reflection element emerges from the combiner at locations intermediate those at which light is transmitted by the transmission element so as thereby to produce a more even field-of-view over the face of the combiner.

As mentioned previously, the holographic element (as used in the embodiments of FIGS. 3 or 4) is preferably selective for light at a particular wavelength emitted by the phosphors of the cathode-ray-tube screen 5. In this way, extraneous ambient light at different wavelengths, such as, for example, caused by sunlight reflected from the surface of the screen 5, will not be passed by the holographic element 24 or 40 to the pilot. It would also be possible to reduce further the extraneous ambient light by, for example, tinting the canopy of the aircraft cockpit so as to filter out light at that wavelength for which the holographic element is selective. Alternatively, holographic filters could be positioned over the display screen in the manner set out in our pending U.K. patent application No. 8192/77, now U.K. Pat. No. 1,574,351.

The holographic element 24 or 40 is preferably formed on the surface of a plate 22 or 41 which is appropriately exposed and developed and then secured to a face of the block 20 or 43 in the manner described above. The holographic element may alternatively be formed directly on a surface of the glass block by coating it with a holographic emulsion and subsequently exposing and developing the coating as appropriate. This alternative arrangement avoids the use of additional glass plates although it will leave the holographic elements exposed to abrasion and the action of the atmosphere and may, moreover, reduce the optical efficiency of the elements.

The blocks 20 and 43, and the plates 22 and 41 need not be of glass but could be of any other suitable material having the desired optical properties. It might also be found desirable to have a combiner with a curved front or rear face so as to modify the internally-reflected and emergent beams. The lower edge face 4 intermediate the front and rear faces need not necessarily be angled in the manner described, although light will be transmitted to the block 20 most efficiently when the beam of light 25 from the display screen 5 is incident at right angles to the lower edge face. It might be found desirable, for example, in order perhaps to produce a more compact configuration of the apparatus, to arrange for the beam of light 25 from the display screen 5 to be incident on the lower edge face 4 at an angle away from the normal so that the beam of light is refracted towards or away from the front face of the combiner. In other arrangements the holographic element 24 or 40 may be arranged to reflect or transmit light at an angle to the normal from the rear or front face of the combiner. The combiner could also be arranged horizontally so as to extend the field-of-view along a horizontal axis.

Although the apparatus has been described for use in head-up display systems in aircraft it is not restricted to such an application. The rear face of the optical element, which is the combiner 1 in the head-up display application, may be completely opaque for applications in other forms of display systems and also provides an increased field-of-view. The apparatus need not, furthermore, be used with a cathode-ray-tube display but could, for example, be used with any other suitable form of display.

What I claim is:

1. Display apparatus comprising: an optical element substantially of optically-transparent material, said optical element having a pair of opposite faces; display means directing light to one of said faces of said optical element, said one face reflecting a part at least of the light from said display means internally of said optical element to the other face of said optical element, said other face of said optical element reflecting a part at least of said light back to said one face to thereby produce successive internal reflections of said light within said optical element along said optical element; and a holographic element, said holographic element passing externally of said optical element a part of said light directed to the one or other face from successive internal reflections so that light from said display means emerges from the one or other face of said optical element via said holographic element at locations spaced along the optical element.

2. Display apparatus according to claim 1, wherein said holographic element is a reflection holographic element, said holographic element being mounted adjacent a face of said optical element to reflect light incident on the holographic element through the opposite face of said optical element.

3. Display apparatus according to claim 1, wherein the holographic element is a transmission holographic element, said holographic element being mounted adjacent a face of the optical element to transmit light incident on the holographic element through the same face of said optical element.

4. Display apparatus according to claim 1, wherein the holographic element passes light directed to said one or other face of said optical element externally of said optical element to emerge at substantially right angles to one of said opposite faces of said optical element.

5. Display apparatus according to claim 1, wherein the optical element has a face located intermediate the said one face and the said other face, and wherein the light from the display enters the optical element through said intermediate face.

6. Display apparatus according to claim 1, wherein said optical element comprises a block of optically-transparent material having a pair of opposite faces and a plate substantially of optically-transparent material mounted on one of said faces of said block, and wherein said holographic element is formed on a surface of said plate adjacent said block.

7. Display apparatus according to claim 1, wherein said display means includes a screen of a cathode-ray tube.

8. Display apparatus according to claim 1, wherein the opposite faces of the optical element are substantially optically-transparent so that light external of the optical element can be transmitted through the optical element via the opposite faces.

9. Display apparatus according to any one of claims 1 to 8, wherein said holographic element selectively passes, externally of the said optical element, substantially only that light incident on said holographic element at predetermined angles and having predetermined wavelength characteristics.

10. Display apparatus comprising: an optical element substantially of optically-transparent material, said optical element having a front face and a rear face, said front and rear faces being substantially optically-transparent; display means directing light internally of the optical element to said front face, said front face reflecting a part at least of the light from said display means internally of said optical element to said rear face of said optical element, said rear face of said optical element reflecting a part at least of said light back to said front face to thereby produce successive internal reflections of said light within said optical element along said optical element; and a reflection holographic element located forwardly of said rear face, said holographic element reflecting forwardly to said front face a part of that light directed to the rear face from successive internal reflections, said holographic element reflecting said light so as to be incident on said front face at an angle less than the critical angle whereby said light emerges from said front face at locations spaced along the optical element.

11. Display apparatus comprising: an optical element substantially of optically-transparent material, said optical element having a front face and a rear face, said front and rear faces being substantially optically-transparent; display means directing light internally of the optical element to said front face, said front face reflecting a part at least of the light from said display means internally of said optical element to said rear face of said optical element, said rear face of said optical element reflecting a part at least of said light back to said front face to thereby produce successive internal reflections of said light within said optical element along said optical element and a transmission holographic element located rearwardly of said front face, said holographic element transmitting forwardly to said front face a part of the light directed to the front face from successive internal reflections, said holographic element transmitting said light so as to be incident on said front face at an angle less than the critical angle whereby said light emerges from said front face at locations spaced along the optical element.

* * * * *